United States Patent Office 3,299,427
Patented Jan. 17, 1967

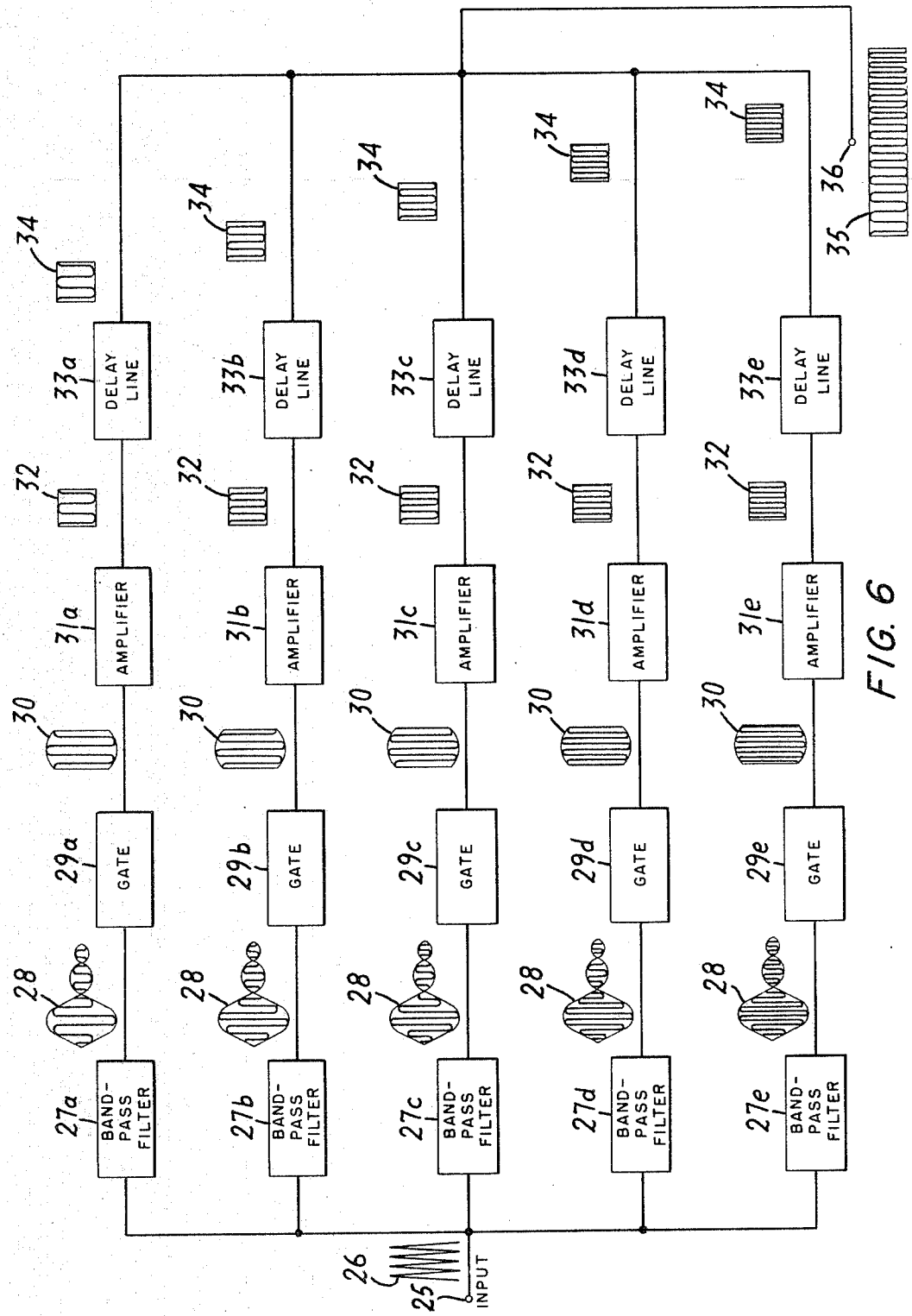

3,299,427
RADAR SYSTEM
Teruo Kondo, Amagasaki, Hyogo, Japan, assignor to Mitsubishi Denki Kabushiki-Kaisha, Tokyo, Japan
Filed May 12, 1964, Ser. No. 366,840
Claims priority, application Japan, May 14, 1963, 38/25,193
9 Claims. (Cl. 343—17.1)

This invention relates to a pulse compression radar system.

In order to increase a maximum possible range determined by a radar system, it is recalled that a long transmission pulse can be used to increase an average transmission power because the peak output of the transmission pulse is actually restricted. Since the use of such a long transmission pulse leads to improvement in a concentration of spectral distribution of the pulse frequencies, a ratio of signal to noise can be improved by receiving the pulse through a narrow band-pass filter to increase an ability to determine a long range. In such a case, however, the conventional type of pulsed radar systems has disadvantages such as a decrease in range resolution, and a reduction in amount of information obtainable from a reflected radar wave. In order to increase the range resolution provided by a long range radar system using the aforesaid long transmission pulse, a chirp radar system has been previously proposed which is one application of a matched filter theory.

As will be well known, the chirp radar system transmits a linearly frequency modulated pulse to spread frequency spectrum, and receives the reflected pulse to compress its pulse length, improving range resolution without adversely deteriorating the ratio of signal to noise.

A chirp signal $e(t)$ transmitted from a chirp radar system is expressed by the equation $$e(t) = U\left(\frac{t}{T}\right) \epsilon^{2\pi j \left(f_c t + \frac{kt^2}{2}\right)} \qquad (I)$$

where $t$ = time
$T$ = period of transmitted pulse
$f_c$ = carrier frequency
$k$ = constant
$U\left(\frac{t}{T}\right) = 0$ if $|t| > \frac{T}{2}$
$U\left(\frac{t}{T}\right) = 1$ if $|t| < \frac{T}{2}$
$\epsilon$ = base of natural logarithm
$j$ = unit of imaginary number or $\sqrt{-1}$ A filter used on the receiver side has the characteristics expressed by the equation $$F(t) = \epsilon^{j\pi \left(\frac{f-f_c}{k}\right)^2} \qquad (II)$$

where $f$ = frequency.

A long pulse used with a long range radar system has a duration as long as several ten or several hundred microseconds or more and is very long as compared with a pulse of the order of a few microseconds used in a radar system ordinarily employed. Such a pulse as long as several ms. cannot be used in the conventional chirp radar system, because a matched filter of such a long delay could not be realized.

An object of the invention is to provide a new and improved radar system increased in average transmission power and high in range resolution.

Another object of the invention is to provide an improved pulse compression system including means for readily compressing such a very long pulse.

According to the invention, there is provided a radar system for transmitting pulses toward a target and determining the position of the target by pulses reflected from the target, comprising transmitting means for transmitting a train of high frequency pulses having different frequencies and a predetermined duration arranged in a predetermined order at predetermined intervals of time and receiving means for receiving said train of pulses reflected from said target, imparting different delays to the respective received pulses, and composing all pulses in said received train of pulses at a common time point.

The invention will become more readily apparent from the following detailed description taken in conjunction with the accompanying drawings in which.

Figure 5A:
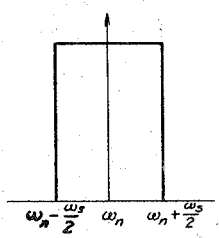

FIGS. 5a, b and c show graphs useful in explaining the operation of the radar system illustrated in FIG. 6; and FIG. 6 shows a block diagram of a modification of the invention and waveforms appearing at various points in the same.

Figure 1:
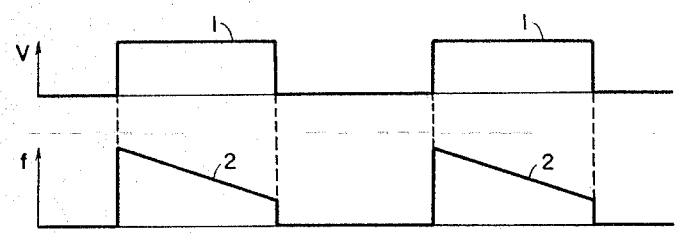
FIG. 1 shows waveforms useful in explaining the conventional type of chirp radar system.

Referring now to FIG. 1 of the drawings, there is illustrated waveforms useful in explaining the conventional chirp radar system. As shown in FIG. 1, wherein the reference characters V and $f$ designate a voltage and a frequency respectively, a square pulsed carrier 1 is linearly frequency modulated with frequencies 2 in the form of a ramp function to spread a spectrum of transmission frequencies on the transmitter side of the chirp radar system and a received pulse is pulse compressed on the receiver side thereof. This compression of pulse improves a range resolution provided by the radar system without deteriorating its ratio of signal to noise.

As previously described, a pulse as long as several ms. cannot be used in the conventional type of chirp radar systems because a matched filter of such a long delay could not be previously realized. This is one of the disadvantages of the conventional chirp radar systems. The invention contemplates to eliminate that disadvantage.

Figure 2:
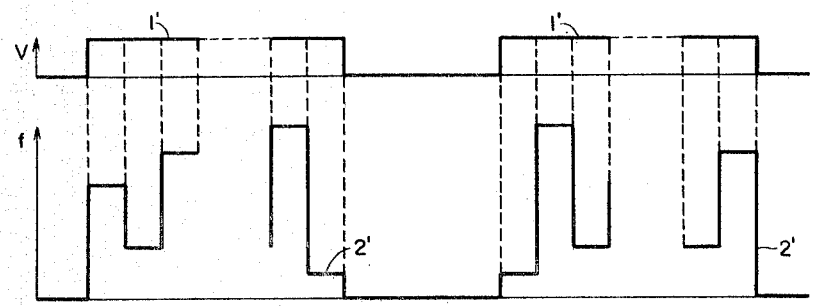
FIGS. 2 and 3 show waveforms useful in explaining the principle of the invention.
Figure 3:
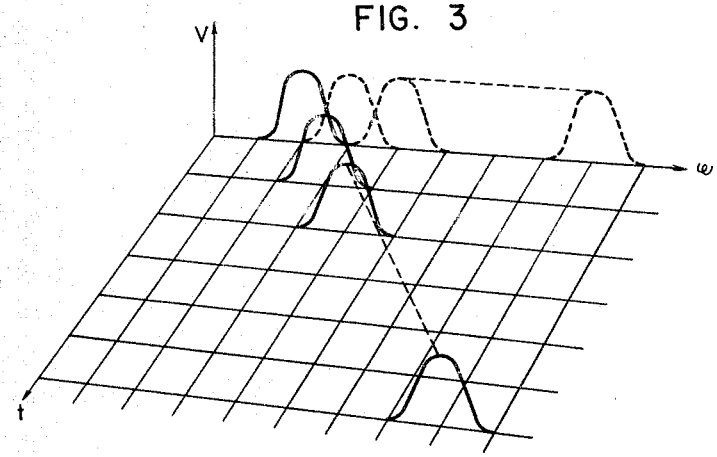

According to the principle of the invention, a long square waveform of voltage pulse $1'$ is divided into some desired number $m$ of sections as shown in FIGS. 2 and 3. All the sections of the pulse may be preferably of a common duration. It is assumed that the $m$ pulse sections have angular frequencies $\omega_n (n=1, 2, \ldots m)$ expressed by the equation $$\omega_n = \omega_0 \pm l_n \frac{2\pi}{T}, \quad n=1, 2, \ldots m \qquad (III)$$

where $l_n$ is some positive integer (see a stepped curve $2'$ shown in FIG. 2).

Also assuming that $\tau$ designates a pulse length of each pulse section just described above, the transmission pulse $f(t)$ is expressed by the equation $$f(t) = \frac{\tau}{T} g(t) \sum_{k=-\infty}^{\infty} \frac{\sin \frac{k\omega\tau}{2}}{\frac{k\omega\tau}{2}} \epsilon^{jk\omega t}$$

where $$g(t) = \sum_{n=1}^{m} \epsilon j\left(\omega_c + l_n \frac{2\pi}{T}\right)t \quad \text{(IV)}$$

$$\omega_c = 2\pi f_0$$

$$\omega = 2\pi f$$

In other words, from FIGS. 2 and 3, wherein the reference characters V, t and ω designate voltage, time and angular frequency respectively, it will be seen that, if the respective pulse sections designated by solid lines are properly delayed and superposed upon one another at a common time point on the receiver side as shown by the dotted line that a wide, substantially square frequency spectrum including a train of pulses of short durations different in frequency is obtained.

For the convenience of illustration, the pulse widths are shown as being substantially equal. However, it is to be noted that the pulse of FIG. 2 or 3 used with the invention be far long as compared with that shown in FIG. 1. The resulting frequency spectrum shown in FIG. 2 has a random distribution of frequency whereas the spectrum has the frequencies distributed to vary progressively and stepwise. Either type of these frequency spectra can be satisfactorily used with the invention as long as the respective frequency components are correlated to one another such that they hold the relationship expressed by the Equation III.

Since the principle of the invention or the stepped frequency modulation has been thus far described, the production of transmission pulse and the compression of received pulses will now be described in conjunction with FIG. 4 of the drawings.

Figure 4:
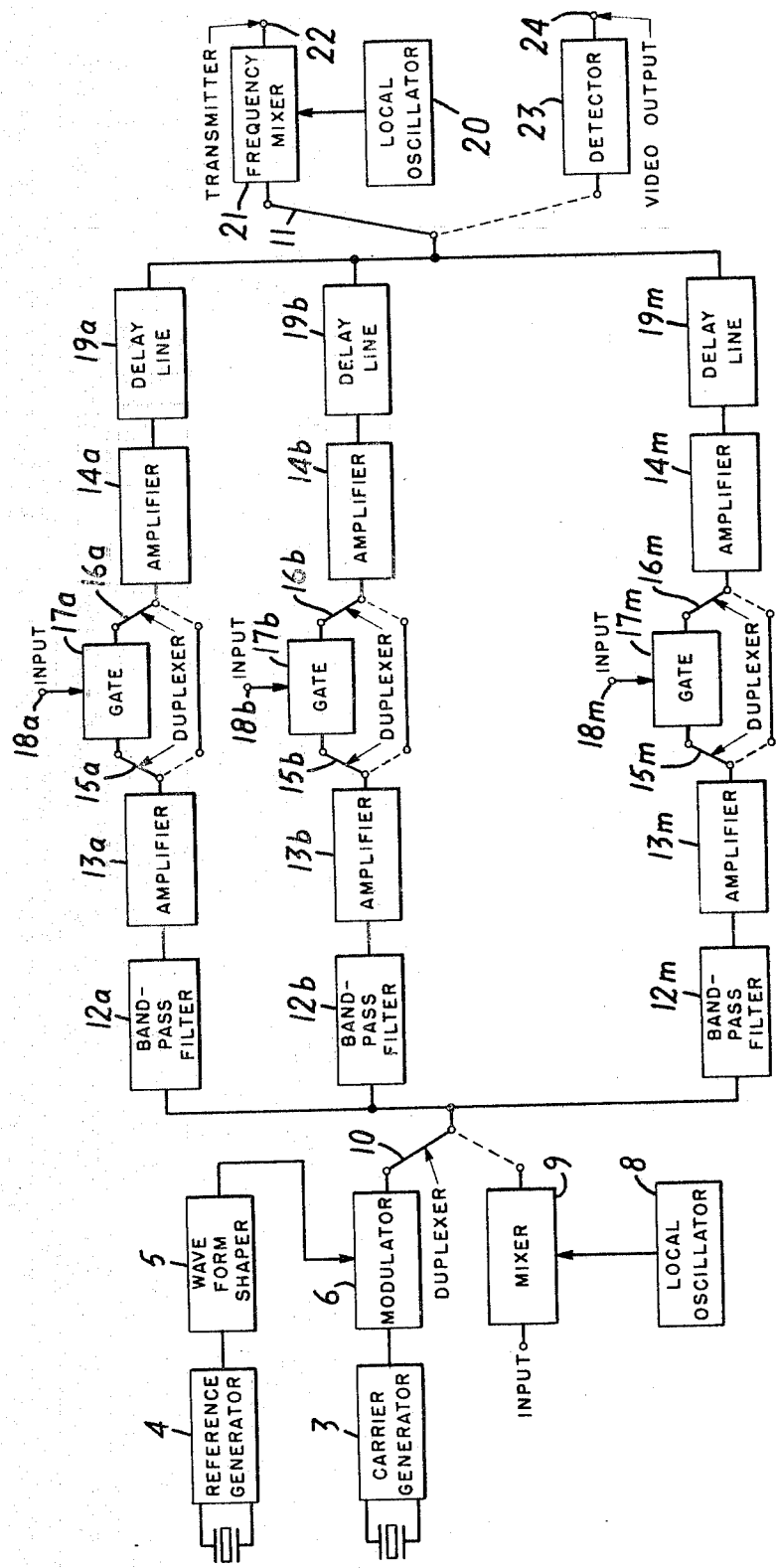
FIG. 4 shows a block diagram of a radar system constructed in accordance with the teachings of the invention.

An arrangement illustrated in FIG. 4 comprises a carrier generator 3, a reference generator 4 connected to a waveform shaper 5 and a modulator 6 supplied by both the carrier generator 3 and the waveform shaper 5. The arrangement also comprises an input terminal 7 to which a received wave is applied, a receiving local oscillator 8 and a frequency mixer 9 connected to both the input terminal 7 and the local oscillator 8. The modulator 6 and the mixer 9 are adapted to be selectively connected through a duplexer 10 to a plurality of parallel paths as will be subsequently described. Since it has been assumed that the wide transmission pulse is divided into m sections, the number of the parallel paths used is m. The parallel circuits are of a similar construction excepting that the circuits have the differently allocated central frequencies and time delays. Therefore only one of the parallel circuits, for example, the uppermost one as viewed in FIG. 4, will be described in detail with the corresponding parts designated by the same reference numerals suffixed with the characters a, b, . . . m.

The uppermost circuit comprises a band-pass filter 12a having its central frequency predetermined and connected to the duplexer 10, an amplifier 13a connected to the filter 12a, and amplifier 14a adapted to be connected either through a gate 17a or directly to the amplifier 13a by a pair of duplexers 15a and 16a disposed on both sides of the gate and synchronized with the duplexer 10. The gate 17a includes another input terminal 18a to which a trigger is applied to control opening and closing thereof and is connected to a delay line 19a having a predetermined time delay. It is to be understood that the band-pass filters 12a through m have the different center frequencies and that the delay lines 19a through m have the different time delays.

The arrangement further comprises a transmitting local oscillator 20 connected to a frequency mixer 21 having a transmitter terminal 22 and a detector 23 having an output terminal 24 for video signal. The delay lines 19a, b, . . . m are adapted to be selectively connected to the mixer 21 and the detector 23 through a duplexer 11 synchronized with the duplexer 10.

The arrangement thus far described is operated as follows:

In order to transmit the radar pulses, the reference generator 4 supplies the reference wave having its repetition rate of $2\pi/T$ to the waveform shaper 5 where the wave is modified into a square waveform including a plurality of harmonics $$l_n \frac{2\pi}{T}$$

(where $l_n$ is any positive integer) whose frequencies are integral multiples of $2\pi/T$. Then this square waveform is supplied to the frequency modulator 6 to frequency modulate a carrier wave $\omega_c$ from the carrier generator 3 into frequency components satisfying the Equation III. The frequency modulated carrier wave is applied through the duplexer 10 to the band-pass filters 12a, 12b, . . . 12m at the outputs of which the frequency components are produced having the frequencies as defined by Equation II respectively. Thus the frequency modulated carrier wave or a long pulse such as shown in FIG. 2 is divided into m pulse sections.

The frequency components thus produced are applied to the gates 17a, 17b, . . . 17m through the amplifiers 13a, 13b, . . . 13m respectively. The frequency component applied to each of these gates is permitted to pass through the associated gate for a predetermined period of time during which a control signal is being applied to its input terminal 18a, 18b, . . . and 12m to thereby be pulsed. The pulses from the gates 17a, 17b, . . . 17m are amplified by the amplifiers 14a, 14b, . . . 14m and applied to the delay lines 19a, 19b, . . . 19m having predetermined different delays respectively. The pulses emerging from the outputs of the delay lines 19a through m are so delayed that the particular pulse from its associated delay line has a time delay equal to the sum of the durations of all the preceding pulses. The delayed pulses from the delay lines 19a, 19b, . . . 19m are added to one another at the input of the duplexer 11 to form a long pulse consisting of a train of pulses different in frequency.

The long pulse thus formed is applied through the duplexer 11 to the frequency modulator 21 to be mixed with a frequency from the local oscillator 20 to produce an upper side-band by single side-band modulation process. This upper side-band is transmitted from the transmitting terminal 22.

Upon receiving the radar wave reflected from a target, a received wave from the receiving input terminal 7 is applied to the frequency mixer 9 to be mixed with a frequency from the local oscillator 8 to produce a lower side-band by single side-band modulation process. This lower side-band is applied to the detector 23 through the bandpass filters 12a, 12b, . . . 12m, the amplifiers 13a, 13b, . . . 13m, the duplexers 15a, 15b, . . . 15m, the duplexers 16a, 16b, . . . 16m, the amplifiers 14a, 14b, . . . 15m, the delay lines 19a, 19b, . . . 19m and the duplexers 11 as in the transmission. The output from the detector 23 is taken out of the video output terminal 24.

In this case, it is to be noted that the time delays used in compressing the received pulses during reception should be reversed from those used in producing the transmission pulses during transmission. In other words, if the frequencies $\omega_1, \omega_2, \ldots \omega_m$ to be transmitted have time delays $\tau_1, \tau_2, \ldots \tau_m$, respectively that the received frequencies must have the time delays $\tau_m, \tau_{m-1}, \ldots \tau_1$ respectively. This can be readily accomplished by utilizing the upper and lower side-bands respectively of the transmitted and received signals.

For an example, it is assumed that transmitted and received signals are of 5,020 and 5,100 megacycles per second. Then the transmitted signal having its frequency of 5,020 megacycles per second must be changed to the received signal having its frequency of 5,100 megacycles per second while the transmitted signal having its frequency of 5,100 megacycles per second must be changed to the received signal having its frequency of 5,020 megacycles per second.

It is assumed that the transmitting local oscillator 20 has its oscillation frequency of 25 megacycles per second and that an upper side-band is extracted from the output of the frequency mixer 21. It is also assumed that the receiving local oscillator 8 has its oscillation frequency of 35,120 megacycles per second and that a lower side-band is extracted from the output of the frequency mixer 9. Under these assumed conditions, the frequencies of $$5,020+25=30,020 \text{ mc. per second and}$$
$$5,100+25=30,100 \text{ mc. per second}$$

appear on the transmitter side while the frequencies of $$35,120-30,020=5,100 \text{ mc. per second and}$$
$$35,120-30,100=5,020 \text{ mc. per second}$$

appear on the receiver side. Thus the time delays for transmission are replaced with those for reception.

In general, if the signals having their respective angular frequencies $\omega_n$ as defined under the Equation III is mixed with the angular oscillation frequency $\omega_t$ of the local oscillator 20 by single side-band modulation process the resulting upper side-band has the angular frequencies expressed by the equation $$\omega_{tn} = \omega_t + \omega_n = \omega_t + \omega_c \pm l_n \frac{2\pi}{T}$$

This upper side-band is then transmitted.

Assuming that the receiving local oscillator 9 has its angular oscillation frequency $\omega_r$ expressed by the equation $$\omega_r = \omega_t + 2\omega_c$$

a lower side-band for the received wave have the angular frequencies expressed by the equation $$\omega_{rn} = \omega_r - \omega_{tn}$$
$$= \omega_t + 2\omega_c - \left(\omega_t + \omega_c \pm l_n \frac{2\pi}{T}\right)$$
$$= \omega_c \mp l_n \frac{2\pi}{T}.$$

Thus it will be appreciated that the lower side-band $\omega_{rn}$ for the received wave is reversed in frequency distribution from the transmission signal $\omega_n$.

If desired, the output signal from the transmitting terminal 22 may be additionally converted in frequency and then transmitted. Also after having frequency converted, the received signal may be applied to the receiving terminal 7. In this connection, it is to be noted that the angular frequency $\omega'_{tn}$ of the signal applied to the receiving terminal 7 is not necessarily equal to the angular frequency $\omega_{tn}$ of the transmission signal. In general, the relationship $$\omega'_{tn} = \omega'_t + \omega_c \pm l_n \frac{2\pi}{T}$$

is held. In this case, $\omega'_t$ may be equal to $\omega_t$. Alternatively $\omega'_t$ may be a predetermined magnitude different from $\omega_t$. Therefore the receiving local oscillator is required only to have its angular oscillation frequency $\omega_r$ expressed by the equation $$\omega_r = \omega'_t + 2\omega_c$$

Also, if desired, a lower side-band $\omega_{tn}$ expressed by the equation $$\omega_{tn} = \omega_t - \omega_n = \omega_t - \left(\omega_c \pm l_n \frac{2\pi}{T}\right)$$

may be used for transmission while the received wave is frequency modulated with a local oscillator frequency of $$\omega_r = \omega'_t - 2\omega_c$$

to produce angular frequencies $\omega_{rn}$ expressed by the equation $$\omega_{rn} = \omega'_t - \left(\omega_c \pm l_n \frac{2\pi}{T}\right) - \omega_r$$
$$= \omega_c \mp l_n \frac{2\pi}{T}.$$

A long radar pulse such as that previously described in conjunction with FIGS. 2 through 4 may be produced by an arrangement illustrated in FIG. 6. Before that arrangement will be described the principles of operation upon which the same is operated will now be described with reference to FIG. 5 wherein the ordinate represents a voltage and the abscissa represents an angular frequency of a time.

Figure 5B:
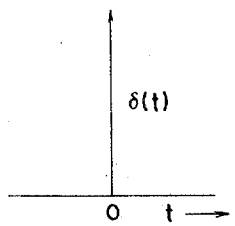

Applied to a band-pass filter whose pass-band width is $\omega_s$ as shown in FIG. 5a is a carrier wave having any angular frequency of $\omega_n$ and pulse modulated with a pulse of extremely short duration or a substantially instantaneous pulse expressed by a function $f(t)$ as shown in FIG. 5b. Then, after the lapse of its inherent delay of L, the band-pass filter provides at its output a response waveform having an angular frequency of $\omega_n+\omega_s$ as shown in FIG. 5c.

Figure 5C:
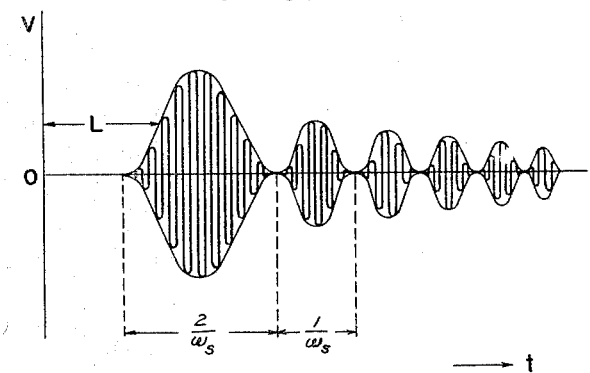

If a carrier frequency $\omega_c$ pulse modulated with a sufficiently narrow pulse is simultaneously applied to any desired number, for example, $m$, of band-pass filters satisfying the Equation III and having different center frequencies then the respective filters produce simultaneously different carrier waves each satisfying the Equation III in the form of a waveform of time function such as illustrated in FIG. 5c.

Referring now to FIG. 6, a substantially short pulse 26 represented by the function $f(t)$ as above described is applied from an input terminal 25 to any desired number, in this case five, of band-pass filters 27a, 27b, 27c, 27d and 27e satisfying the Equation III and having predetermined different center frequencies respectively. The band-pass filter may be of a crystal or LC filter. The output waveforms 28 from these band-pass filters are connected to the associated gates 29a, 29b, 29c, 29d and 29e which, in turn, produce output waveforms 30 respectively. These output waveforms 30 from the gates 29a through e are applied to saturation amplifiers 31a, 31b, 31c, 31d and 31e to be amplified to the saturation level. The output pulses 32 from the amplifiers 31a through e are differently delayed by delay lines 33a, 33b, 33c, 33d and 33e having predetermined different time delays respectively as previously described in conjunction with FIG. 4. The delay line may be made of mercury or fused quartz type and could be arranged in any predetermined order. The differently delayed output pulses 34 from the delay lines 33a through e are combined into a wide pulse 35 which, in turn, is supplied to an output terminal 36.

With the arrangement illustrated it will be therefore appreciated that the pulse 26 applied to parallel paths each including the filter 27, the gate 29, the saturation amplifier 31 and the delay line 33 to be composed into the wide pulse signal 35 adapted to be transmitted through the output terminal 36.

As in the arrangement shown in FIG. 4, the arrangement of FIG. 6 is advantageous in that the transmitting filters can be simultaneously used as the receiving filters by using an upper side-band and a lower side-band for transmission and reception respectively or vice versa.

From the foregoing, it will be appreciated that this invention has provided a pulse compression radar system of simple construction capable of transmitting and receiving very long pulses or much longer pulses than chirp signals ensuring that its ability to determine a long range is increased without reducing its range resolution.

While the invention has been described in conjunction with the certain embodiments thereof it is to be understood that various changes and modifications may be resorted to without departing from the spirit and scope of the invention. For example, instead of the transmitting frequency applied, as input, to the band-pass filters, any suitable frequencies, as input frequencies, may be applied to the band-pass filters and a carrier wave is modulated with the resulting composed signal for transmission. The input frequencies used are preferably frequencies for which the band-pass filters can be easily designed and constructed.

What I claim is:

1. In a radar system for transmitting pulses toward a target and determining the position of the target by pulses reflected from said target, the combination of transmitting means for transmitting a train of pulses to said target and each composed of different frequencies of a predetermined duration, and arranged in a random order at predetermined intervals of time, and receiving means for receiving said train of pulses reflected from said target, means imparting a different time delay to each pulse received in the train of pulses, and means combining all of the differently delayed pulses at a common time point.

2. In a radar apparatus for transmitting pulses toward a target and determining the position of the target by pulses reflected from the target, the combination of a signal source for producing a signal having a plurality of different frequencies, a group of filters for separating the signal from said signal source into a plurality of signal portions each different in frequency, a group of gates for converting the outputs from said group of filters to pulses each having a predetermined duration and equal in phase to each other, a group of delay circuits for receiving said pulses from said groups of gates and imparting different time delays to said pulses, means for composing the pulses as outputs from said group of delay circuits to obtain a train of pulses including high frequency pulses having different frequencies and a predetermined different duration, and arranged in a predetermined order at predetermined intervals of time, means for transmitting said train of pulses toward said target, means for receiving said train of pulses reflected from said target, a first group of filters for separating the received train of pulses into pulses different in frequency, a second group of delay circuits for imparting different time delays to the outputs from said first group of filters to equalize the phases of all pulses, and means for composing the output pulses from said second group of delay circuits into a signal and detecting said signal.

3. In a radar apparatus for transmitting pulses with a repetition period of T toward a target and determining the position of the target by the pulse wave reflected from the target, the combination of a signal source for producing a signal having a plurality of different angular frequencies represented by $$\omega_c \pm l_n \frac{2\pi}{T}$$

where $\omega_c$ is a central angular frequency and $l_n$ is a positive integer, duplexer means, a group of filters having means applying said signal from said signal source thereto through said duplexer means only during transmission and separating said signal into a plurality of output pulses having said different angular frequencies, a group of delay circuits for imparting to the output pulses from said group of filters respective time delays different from each other by the pulse length, another duplexer means, means for composing outputs from said groups of delay circuits to obtain through said another duplexer means a train of pulses including high frequency pulses having different frequencies and predetermined duration only during transmission, said high frequency pulses being arranged in a predetermined order at predetermined intervals of time, means for modulating said train of pulses with a local oscillation frequency having an angular frequency of $\omega_t$ by single side-band modulation to produce an upper side-band having an angular frequency $\omega_{tn}$ represented by $$\omega_{tn} = \omega_t + \omega_c \pm l_n \frac{2\pi}{T}$$

and means transmitting a train of pulses including said upper side-band toward said target, means for receiving said last-mentioned train of pulses reflected from said target and frequency converting the received train of pulses having angular frequencies of $$\omega_t + \omega_c \pm l_n \frac{2\pi}{T}$$

to a local receiver oscillation frequency having an angular frequency $\omega_r$ $$\omega_r = \omega_t + 2\omega_c$$

by single side-band modulation to produce a lower side-band having angular frequencies represented by $$\omega_{rn} = \omega_r - \left(\omega'_t + \omega_c \pm l_n \frac{2\pi}{T}\right)$$

$$= \omega_c \mp l_n \frac{2\pi}{T}$$

means applying said received train of pulses through said duplexer means to said group of filters only during reception to be separated into pulses different in frequency, said group of delay circuits being effective to impart different time delays to the outputs from said group of filters to thereby equalize the phases of all pulses, and means for composing the output pulses from said group of delay circuits through said another duplexer means into a signal and detecting said signal.

4. In a radar apparatus for transmitting pulses with a repetition period of T toward a target and determining the position of the target by the pulse wave reflected from the target, the combination of a signal source for producing a signal having a plurality of different angular frequencies represented by $$\omega_c \pm l_n \frac{2\pi}{T}$$

where $\omega_c$ is a central angular frequency and $l_n$ is a positive integer, duplexer means, a group of filters having means applying said signal from said signal source thereto through said duplexer means only during transmission and separating said signal into a plurality of pulses having said different angular frequencies, a group of delay circuits for imparting to output pulses from said group of filters respective time delays different from each other, another duplexer means, means for composing the outputs from said groups of delay circuits to obtain through said another duplexer means a train of pulses including high frequency pulses different in frequency and having predetermined durations only during transmission, said high frequency pulses being arranged is a predetermined order at predetermined intervals of time, means for modulating said train of pulses with a local oscillation having an angular frequency of $\omega_t$ by single side-band modulation to produce a lower side-band having an angular frequency $\omega_{tn}$ represented by $$\omega_{tn} = \omega_t - \left(\omega_c \pm l_n \frac{2\pi}{T}\right)$$

and means transmitting a train of pulses including said lower side-band toward said target, means for receiving said last-mentioned train of pulses reflected from said target and frequency converting the received train of pulses having angular frequencies of $$\omega'_t - \left(\omega_c \pm l_n \frac{2\pi}{T}\right)$$

with a local receiver oscillation having an angular frequency $$\omega_r = \omega'_t - 2\omega_c$$

by single side-band modulation to produce a signal having angular frequencies $\omega_{rn}$ $$\omega_{rn} = \omega_r - \left(\omega'_t + \omega_c \pm l_n \frac{2\pi}{T}\right)$$

$$= \omega_c \mp l_n \frac{2\pi}{T}$$

means applying said received train of pulses through said duplexer means to said group of filters only during reception to be separated into pulses different in frequency, said group of delay circuits being effective to impart different time delays to the output from said group of filters to thereby equalize the phases of all pulses, and means for composing the output pulses from said group of delay circuits through said another duplexer means into a signal and detecting said signal.

5. A radar apparatus as claimed in claim 3, wherein said angular frequency $\omega'_t$ is equal to $\omega_t$.

6. A radar apparatus as claimed in claim 3, wherein $\omega'_t$ is different from $\omega_t$.

7. A radar apparatus as claimed in claim 4, wherein $\omega'_t$ is equal to $\omega_t$.

8. A radar apparatus as claimed in claim 4, wherein $\omega'_t$ is different from $\omega_t$.

9. In a radar apparatus for transmitting pulses toward a target and determining the position of the target by pulses reflected from said target, the combination of a signal source for producing a signal having a plurality of different frequencies, a group of filters for separating the signal from said signal source into a plurality of signal portions each different in frequency, a group of gates for converting the outputs from said group of filters to pulses each having a predetermined duration and equal in phase to each other, a group of delay circuits for receiving said pulses from said group of gates and imparting different time delays to said pulses, means for composing the pulses as outputs from said group of delay circuits to obtain a train of pulses including high frequency pulses having different frequencies and a predetermined different duration, and arranged in a predetermined order at predetermined intervals of time, means for transmitting said train of pulses toward said target, means for receiving said train of pulses reflected from said target, a first group of filters for separating the received train of pulses into pulses different in frequency, a second group of delay circuits for imparting different time delays to the outputs from said first group of filters to equalize the phases of all pulses, and means for composing the output pulses from said second group of delay circuits into a signal and detecting said signal, said reflected pulses being received as a reflected wave and said means for receiving said train of pulses reflected as a wave from said target comprising means for receiving said reflected wave from said target and demodulating said received wave such that the received pulses are in reverse order from said train of transmitted high frequency pulses as to the order of frequencies thereof.

References Cited by the Examiner

UNITED STATES PATENTS

| | | |
|---|---|---|
| 2,624,876 | 1/1953 | Dicke. |
| 2,923,004 | 1/1960 | Warnecke _____ 343—14 |
| 3,090,953 | 5/1963 | Frank. |
| 3,110,897 | 11/1963 | Laurent _____ 343—14 X |
| 3,156,914 | 11/1964 | Welti _____ 343—17.2 X |
| 3,181,156 | 4/1965 | Ward _____ 343—14 X |

CHESTER L. JUSTUS, *Primary Examiner.*

R. D. BENNETT, *Assistant Examiner.*